United States Patent Office 3,331,237
Patented July 18, 1967

3,331,237
PNEUMATIC LEAK TEST PANEL
Urho A. Strang, Livonia, Mich., assignor to Jered Industries, Inc., Birmingham, Mich., a corporation of Michigan
Filed Dec. 7, 1964, Ser. No. 416,251
6 Claims. (Cl. 73—40)

My invention relates generally to inspection equipment for determining the quality of castings and other manufactured products, and more particularly to a pneumatic leak test system for measuring the porosity of a test part and for detecting flaws such as holes or cracks in a test part.

The quality of a manufactured part can be checked by subjecting the part to a pneumatic pressure and then isolating the pneumatic circuit of which the part forms a portion and measuring the rate of pressure decrease in the isolated circuit. I contemplate that appropriate tolerances may be specified for any given test procedure with a part of known volume. The improved leak test panel of my invention can be used for determining whether the part in question falls within the tolerances that are specified.

By employing known design characteristics of orifices and pneumatic circuits of this type the sensitivity of the system can be evaluated and the system itself can be calibrated to satisfy the tolerance limitations of any particular part. The effect on the sensitivity of the system of the test pressure that is employed can be evaluated. The same is true for the test time that is used for determining rate of leakage. The basic Boyle's law may be used to establish a proper relationship between leakage rate and the volume of the part itself. For example, a given leakage rate for a part of small volume would indicate a smaller leak size than the leak size that would be indicated by the same leakage rate in a part having a larger volume.

According to a principal feature of my invention I have provided a system that includes a diaphragm cell having two pneumatic test chambers, a first one of the chambers being subjected to a test pressure and the second chamber being subjected to the pressure in the pneumatic circuit in which the test part is situated. Provision is made for rapidly filling the test part with a fill pressure and at the same time isolating the test part from the diaphragm cell during the filling operation. An automatically controlled pressure bleed valve or dump valve is used in cooperation with the valve that controls distribution of charge pressure to the test part. After the filling operation is completed, the test pressure distribution valve is closed. At that time the pressure of the test part is higher than the pressure that normally would be made available to the first chamber of the diaphragm cell. Upon closing the distribution valve, the dump valve is opened and the pressure of the test part immediately begins to fall to a value that is only slightly different than the pressure that exists at that instant in the chambers of the diaphragm cell. Throughout this portion of the operation cycle the diaphragm cell chambers and the related portions of the circuit are isolated from the test part itself. Thus the pressure variations in the test part during this initial phase of the cycle do not produce pressure fluctuations in the system.

The diaphragm cell is isolated from the test part by a so-called balance valve. After the dump valve reduces the pressure to a value that is only slightly different than the test pressure in the chambers of the diaphragm cell, the balance valve is caused to open thereby connecting directly the test part to the chambers of the diaphragm cell. An electrical timer is set into operation at that instant and the complete circuit is allowed to stabilize during the time interval in which the stabilize timer is operating. At the end of the operation of the stabilize timer, a so-called divider valve in the system interrupts communication between the test pressure source, which may be in the form of a pressure regulator valve, and the first chamber of the diaphragm cell. At this instant the operator takes test readings of the difference in pressure across the diaphragm of the diaphragm cell. Changes in pressure across the diaphragm result in deflections of the diaphragm, and the rate at which the deflections take place is a measure of the rate of leakage in the test part.

The provision of a system of the type above set forth being a principal object of my invention, it is a further object of my invention to provide a valve system for measuring the rate of leakage of air from a test part wherein provision is made for isolating the pressure sensitive elements of the system during the pressure charging portion of the test cycle thereby reducing undesirable pressure fluctuations during the portion of the cycle in which the leakage rate is being measured.

It is a further object of my invention to provide a system of the type above set forth wherein the time required for each phase of the test cycle is reduced to a minimum thereby reducing the over-all test time.

It is a further object of my invention to provide a leak test system of the type above set forth which is relatively inexpensive to manufacture and which can be used by an operator without any special training.

It is a further object of my invention to provide a system of the type above set forth wherein the leakage rate may be determined by means of a direct reading instrument or a direct indicating recorder thereby facilitating the inspection procedure.

Further objects and features of my invention will become apparent from the following description and from the accompanying drawings wherein.

Figure 1:
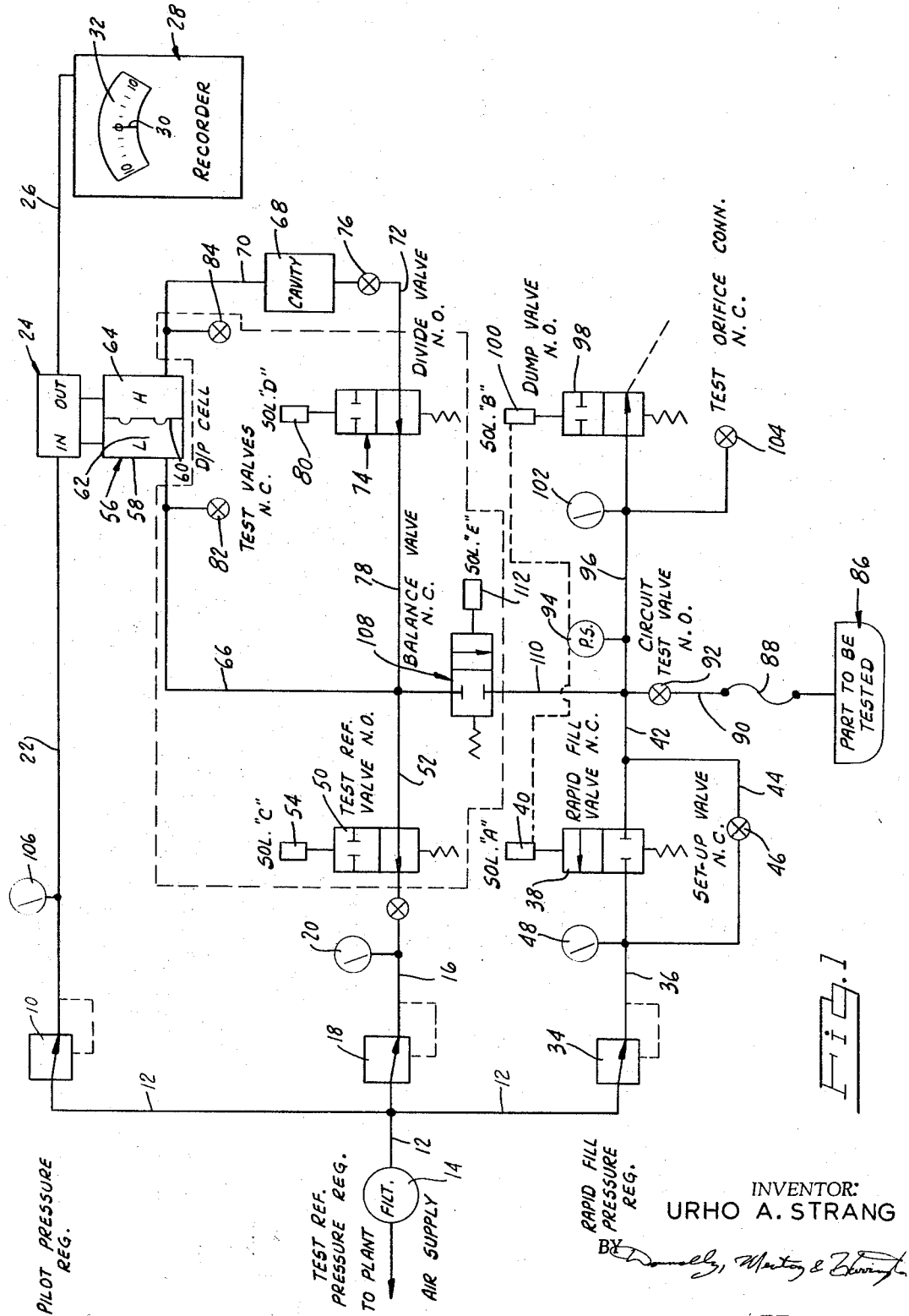
FIG. 1 shows in schematic form a valve diagram embodying the features of my invention.

In FIG. 1 numeral 10 designates generally a test reference pressure regulator valve which is situated in pressure line 12. This line is connected to an air supply source of the usual type used in manufacturing plants.

Numeral 14 indicates an air filter situated between the plant air supply and the valve system. A branch air passage 16 is in communication with passage 12 as indicated. Located in passage 16 is a pilot pressure regulator valve 18 which is adapted to maintain a pressure in passage 16 at a relatively constant intermediate value such as 20 p.s.i. In contrast, the plant air supply may be approximately 90 p.s.i. or higher.

Numeral 20 indicates a gauge situated in passage 16. This permits a visual reading of the pressure in passage 16.

The downstream side of the regulator valve 10 is connected to test pressure passage 22 which communicates with the left side of a signal amplifier in the form of a modulator valve 24. The outlet side of the modulator valve 24 is connected by means of a passage 26 with a recording instrument 28 which may be in the form of a Bourdon tube. Pressure variations in passage 26 will result in fluctuations of an indicator needle 30 which sweeps across a calibrated dial 32. It will record pressure changes in passage 26.

A reference pressure of approximately 3 p.s.i. may be maintained in passage 26 by the regulator valve 24 at all times. This reference pressure is distributed to the instrument 28 and is used as a zero pressure reference point, from which pressure deviations are measured.

A rapid fill regulator valve 34 also is situated in communication with passage 12. The downstream side of regulator valve 34 communicates with passage 36 which extends to a rapid fill valve 38. Regulator valve 34 maintains a pressure in passage 36 that normally is slightly in excess of the pressure maintained in passages 16 and 52. In one operating embodiment, the pressure in passage 36 may be 10 p.s.i. higher than the pressure in passages 16 and 52.

Rapid fill valve 38 is operated by means of a solenoid 40. It is capable of assuming either one of two positions. When it is in the position shown, communication between passage 36 and a passage 42 is interrupted. For the purpose of setting-up the instrument for a test installation, the valve 38 can be by-passed by a passage 44. Located in the passage 44 is a manual shut-off valve 46 which normally is closed. During automatic operation of the system, the valve 46 has no function.

Valve 38 normally is closed, but when the solenoid 40 is energized the valve will shift from the position shown to the other position thereby establishing communication between passages 36 and 42. The gauge 48 can be provided as shown to permit visual indications of the pressure in the passage 36.

A test reference valve 50 is in communication with passage 16. It normally assumes the position shown. It is capable when it is in this position of establishing communication between passages 16 and 52. Valve 50 is operated by means of a solenoid 54. When solenoid 54 is energized, the valve 50 shifts from the open circuit position shown to a closed circuit position.

Shown at 56 is a diaphragm cell comprising a housing 58 and a flexible diaphragm 60. The diaphragm 60 divides housing 58 into two pressure chambers. These chambers are identified as a low pressure chamber 62 and a high pressure chamber 64. The low pressure chamber 62 is in fluid communication with passage 52 through a passage 66.

The high pressure chamber 64 communicates with a cavity 68, which may function as a plenum chamber. This connection is established by passage 70. Cavity 68 is connected by means of a passage 72 with a divide valve 74. A manual shut-off valve 76, which normally is open during the operation of the system, can be provided in passage 72.

The divide valve 74, when it assumes the position shown, establishes communication between passage 72 and passage 78, which extends to the passages 66 and 52. Valve 74 is capable of assuming either of two positions. It is operated by means of a solenoid 80. The valve normally assumes the open position shown, but when the solenoid 80 is energized, the valve is shifted to the closed position.

A connection 82 can be provided in passage 66 to facilitate the mounting of a pressure gauge or pressure recording instrument to indicate the pressure in the chamber 62. A similar connection 84 can be provided for accommodating a pressure recording instrument for recording the pressure in chamber 64.

The part to be tested is designated in FIG. 1 by reference character 86. Its interior can be connected by means of a flexible hose 88 with passage 90 which is connected to passage 42.

A circuit test valve 92, which is manually controlled, can be disposed in passage 90. It normally is open, but it can be closed to disconnect the flexible hose 88 from the system.

A pressure switch 94 is situated in a passage 96 which communicates in turn with passages 42 and 90. The function of the pressure switch 94 will be described subsequently. It senses the pressure in passage 96 and responds to pressure changes therein to open and close the circuits for the solenoids for the rapid fill valve 38 and a dump valve 98.

The dump valve 98 is in communication with the passage 96 and it normally assumes an open position, as indicated in FIG. 1, so that passage 96 will be opened to an exhaust port. It is controlled by a solenoid shown at 100. That solenoid causes the valve to shift from the open position shown to a closed position whenever the solenoid 100 is energized.

A pressure gauge 102 can be provided in passage 96 to provide a visual indication of the pressure therein. A test orifice or calibration connection is shown at 104. It normally is closed but it can be opened to permit calibration of the system.

Another gauge 106 can be situated in passage 22 to provide a visual indication of the pressure on the downstream side of the regulator valve 10.

The portion of the system that is supplied with regulated pressure from regulator valve 10 can be isolated from the portion of the system that is supplied with pressure from the regulator valve 18 by means of a balance valve 108. That valve is situated in a cross-over passage 110 which provides communication between the main passages 42 and 52. The balance valve normally assumes the closed position shown in FIG. 1. It is controlled by a solenoid 112, when the solenoid 112 is energized the valve 108 assumes an open position, thereby establishing communication between the circuit region of which passage 52 forms a part and the circuit region of which passage 42 forms a part.

Figure 2:
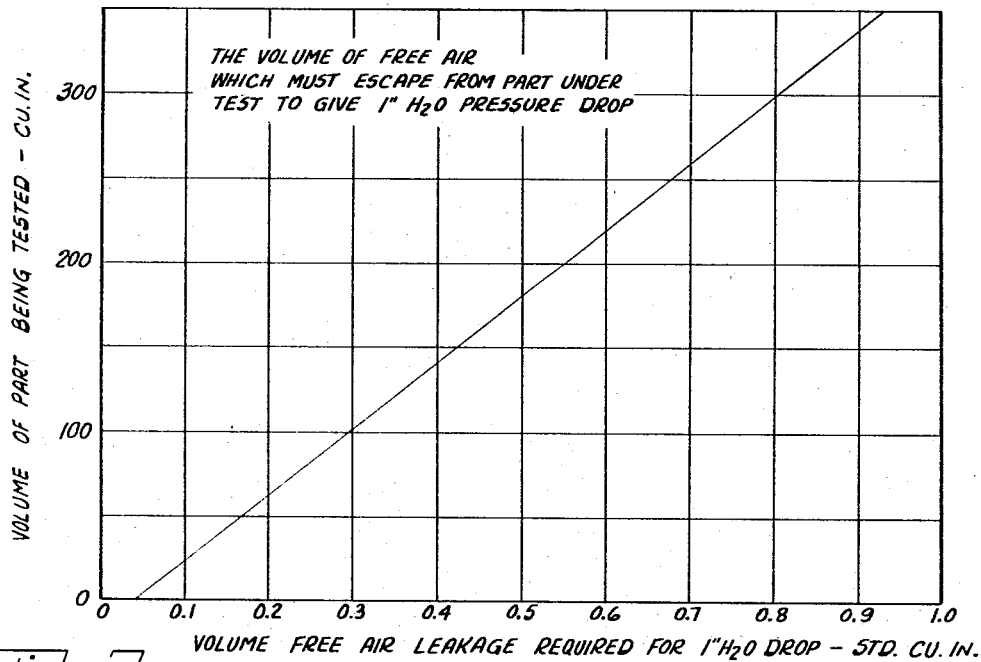
FIG. 2 is a graph showing the relationship between volume of the test part and the air leakage required for a given pressure drop.
Figure 3:
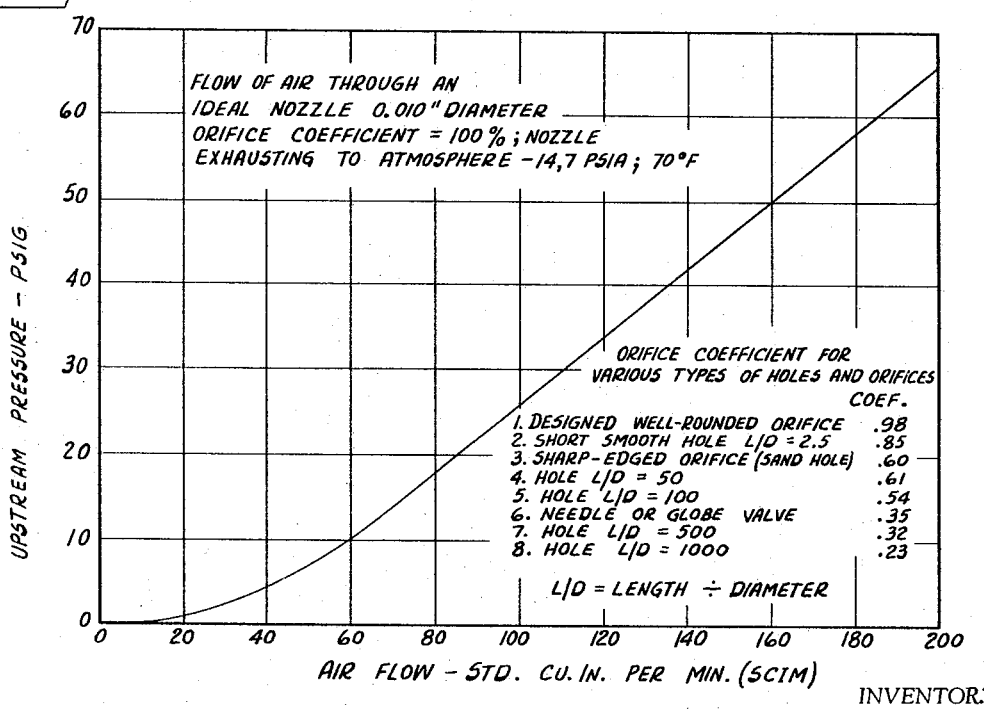
FIG. 3 is a chart showing the relationship between the pressure on the upstream side of an orifice having an orifice coefficient of 1.00 and the rate of flow through the orifice.

In FIG. 2 the relationship between the volume of the part to be tested and the volume of leakage required for each pressure increment is plotted. By using this chart the basic sensitivity of the system and the size of leak which can be checked may be determined in advance. The plot of the FIG. 3 shows the air flow through an orifice with various upstream pressures. It can be used to determine the effect of upstream pressure on the time required to carry out a test on any given test part and to determine the equivalent hole size for any given leakage rate.

In carrying out the test cycle the part to be tested is filled rapidly at the beginning of the test until the pressure of the part is considerably in excess of the pressure that is used during the latter stages of the cycle when the leak rate is determined. By employing this high pressure, rapid-fill technique the part can be charged in a relatively short time and the time necessary to obtain an equalization of the temperature between the part and the fill air can be reduced.

During the filling of the part the orificing effect of the rapid fill valve tends to produce a drop in the temperature of the air in the part. This effect, however, tends to be counteracted by a tendency of the air to become heated as it becomes pressurized. Also the air, as it passes through the regulator and the associated passages, tends to pick up heat from the part itself. This tendency also partly offsets the cooling effect due to orificing of the air.

The filling time that is necessary and the time required to effect temperature stabilization will depend, of course, upon the shape of the part and the volume of the part. It will also depend upon the heat conducting properties of the material of which the part is formed. A part having a smooth inside surface of generally spherical form, for example, will have less surface area in contact with the fill air and a longer fill time will be required than that which will be needed for a rough casting of non-spherical shape if all other factors are equal.

In carrying out a test cycle the part to be tested is connected by means of an airtight fitting to the flexible conduit or hose 88. The rapid fill valve 38 at this time is closed and the dump valve 98 is open. The balance valve 108 is closed. To start the test, a switching circuit causes the solenoid for the rapid fill valve 38 to become energized. It also causes the solenoid 100 for the dump valve 98 to become energized. Thus the valve 38 is open and the valve 98 is closed. The regulator valve 34, which may maintain a pressure of about 30 p.s.i. in passage 36, is caused to distribute pressurized air to passage 42 through the rapid fill valve. This pressurized air passes through manual shut-off valve 92, which normally is open, to the part 86. At this time the test valve 50 is open and the divide valve 74 is open. Both of these valves normally are open when their respective solenoids 54 and 80 are de-energized.

As previously indicated the pressure maintained by the regulator valve 18 is lower than the pressure maintained by the rapid fill regulator valve 34. The pressure differential may be 10 p.s.i.

The pressurized air passes through test valve 50 to passages 66 and 72. The air is distributed from passage 72 through the cavity 68 to the passage 70. At this time both sides of the diaphragm cell 56 become pressurized with the same pressure.

Following movement of the rapid fill valve to the open position, the pressure immediately begins to build up in the part. When a predetermined high pressure is reached the pressure responsive switch 94 is triggered.

The switch 94 opens the circuit for the solenoid 40 thereby de-energizing the solenoid and allowing valve 38 to close. At the same time the solenoid 100 is de-energized thereby allowing dump valve 98 to open. The part 86 thus becomes disconnected from the pressure source. The pressurized interior of the part at the same time becomes opened to exhaust through the dump valve. Thus the pressure begins to fall.

This rapid filling to a high pressure and subsequent reduction of the pressure from its high value to a value corresponding generally to the test pressure, reduces the fill-time that is needed. It reduces also the time necessary to effect temperature stabilization of the air.

When the pressure of the air in the part 86 reaches a value that is only slightly different than the pressure maintained by the regulator valve 18—for example, the differential may be about ½ inch of water—the switch 94 again is triggered. This causes the solenoid 100 again to be energized thereby closing the dump valve 98. At the same time a time delay device becomes energized. After a short time interval—for example, one-half second—the pressurized air becomes stabilized and the timer runs out. At that time the timer triggers the operation of the balance valve 108 by closing the circuit for the solenoid 112. At the instant that the valve 108 is opened the pressure in the test part and in the communicating passages 90, 42 and 96 is only very slightly different than the pressure in passages 52, 78 and 66.

As soon as the balance valve is open, a so-called stabilize timer, not shown, begins to operate. It is apparent that during the time the stabilize timer is functioning, which may be approximately 4 seconds, the pressure in chambers 62 and 64 are identical. Any pressure fluctuations tend to become eliminated during this 4 second interval. When the stabilizing time has run-out, the circuits for the solenoids 54 and 80 become closed thereby energizing the divide valve and the test reference valve. The test reference valve and the divide valve then close. The high pressure chamber 64 at this instant becomes isolated from the rest of the system. It is also at this instant that a test timer begins to operate. It is during the operation of the test timer that the actual test readings are made. This interval may be 10 seconds.

The pressure in the cavity 68 and in the high pressure chamber 64 is used as a reference pressure, and it is compared to the pressure in the chamber 62 of the diaphragm cell. The pressure in the chamber 62 at this instant is the same as the pressure in the part to be tested since it is directly connected to the part through the balance valve. If the part to be tested is defective, the pressurized air will leak through the part thereby causing the pressure in chamber 62 to decrease. This then will cause a deflection of the diaphragm 60 during the 10 second test time interval. Deflection of the diaphragm in turn will affect the calibration of the regulator 24, and thus the regulator output pressure in passage 26 will be changed so that its magnitude is proportional to the deflection of the diaphragm 60. Any slight pressure variation across the diaphragm 60 will be magnified by the regulator 24 so that an amplified signal will be obtained in passage 26. This amplified signal then is distributed to the recording instrument 28 when direct readings can be obtained.

If the part to be tested is defective, the operator can determine this by visually noting the deflection of the needle 30 during the test time interval. If the deflection of the needle 30 is within the permissible tolerances that are specified, the part is accepted. If it deflects beyond the tolerances, the part is rejected.

After the 10 second test time is completed, the circuit is returned to the condition illustrated in FIG. 1, so that it is available for another test.

Having thus described a preferred embodiment of my invention, what I claim and desire to secure by U.S. Letters Patent is:

1. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, a balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, and a connection forming a part of said second circuit portion between said signal producing means and said recording instrument whereby said instrument responds to said signal pressure.

2. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, a connection forming a part of said second circuit portion between said test signal producing means and said recording instrument whereby said instrument responds to said signal pressure, said test signal producing means comprising a diaphragm cell having a diaphragm situated between two pressure chambers, separate branch passages forming a part of said second circuit portion communicating with each pressure chamber, each chamber being subjected to the lower pressure that exists normally in said second circuit portion, and a divide valve means for interrupting communication between one of said chambers and said second circuit portion thereby isolating said one chamber upon movement of said balance valve means to an open circuit position, said test part being in communication with the other chamber upon movement of said balance valve to an open circuit position.

3. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, a balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, a connection forming a part of said second circuit portion between said test signal producing means and said recording instrument whereby said instrument responds to said signal pressure, said test signal producing means comprising a diaphragm cell having a diaphragm situated between two pressure chambers, separate branch passages forming a part of said second circuit portion communicating with each pressure chamber, each chamber being subjected to the lower pressure that exists normally in said second circuit portion, a divide valve means for interrupting communication between one of said chambers and said second circuit portion thereby isolating said one chamber upon movement of said balance valve to an open circuit position, said test part being in communication with the other chamber upon movement of said balance valve to an open circuit position, and test reference valve means for interrupting distribution of said lower pressure to said test signal producing means following movement of said balance valve means to an open circuit position and movement of said divide valve means to a chamber isolating position.

4. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, a balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, a connection forming a part of said second circuit portion between said signal producing means and said recording instrument whereby said instrument responds to said signal pressure, and a pressure regulator amplifier valve means disposed in said second portion between said instrument and the portion of said second circuit portion that is subjected to said lower pressure, said pressure regulator amplifier valve means being responsive to flexure of said diaphragm to produce a resultant signal pressure which is recorded by said instrument.

5. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, a connection forming a part of said second circuit portion between said test signal producing means and said recording instrument whereby said instrument responds to said signal pressure, said test signal producing means comprising a diaphragm cell having a diaphragm situated between two pressure chambers, separate branch passages forming a part of said second circuit portion communicating with each pressure chamber, each chamber being subjected to the lower pressure that exists normally in said second circuit portion, and a divide valve means for interrupting communication between one of said chambers and said second circuit portion thereby isolating said one chamber upon movement of said balance valve means to an open circuit position, said test part being in communication with the other chamber upon movement of said balance valve to an open circuit position, one chamber of said diaphragm cell being subjected to a test reference pressure and the other chamber thereof being in fluid communication with said test part upon movement of said balance valve means to an open circuit position, and a pressure amplifier valve means in said second circuit portion between said instrument and the portion of said second circuit portion that is subjected to said lower pressure said amplifier valve means being responsive to flexure of said diaphragm to produce a resultant signal pressure which is recorded by said instrument.

6. In a leak test instrument for detecting leaks in a test part, a source of pressure, a pressure recording instrument, a test signal producing means, conduit structure including a first circuit portion interconnecting said pressure source and the test part and a second circuit portion communicating with said source and said signal producing means, pressure regulator valve means for maintaining a first test pressure in said second circuit portion and a high pressure in said first circuit portion, a balance valve means for interrupting and establishing communication between said circuit portions, a rapid fill valve means in said first circuit portion for establishing and interrupting distribution of said higher pressure to said part, dump valve means in said first circuit portion for establishing and interrupting communication between said part and an exhaust region, said dump valve means being adapted to be moved to an open circuit position upon movement of said rapid fill valve means to a closed circuit position, means for closing said dump valve means and opening said balance valve means when the pressure in said part approaches the pressure in said second circuit portion, said test signal producing means responding upon movement of said balance valve means to an open circuit position to a variation in the pressure differential in said circuit portions to produce a test signal pressure that is proportional to such pressure differential, a connection forming a part of said second circuit portion between said test signal producing means and said recording instrument whereby said instrument responds to said signal pressure, said test signal producing means comprising a diaphragm cell having a diaphragm situated between two pressure chambers, separate branch passages forming a part of said second circuit portion communicating with each pressure chamber, each chamber being subjected to the lower pressure that exists normally in said second circuit portion, a divide valve means for interrupting communication between one of said chambers and said second circuit portion thereby isolating said one chamber upon movement of said balance valve to an open circuit position, said test part being in communication with the other chamber upon movement of said balance valve to an open circuit position, test reference valve means for interrupting distribution of said lower pressure to said test signal producing means following movement of said balance valve means to an open circuit position and movement of said divide valve means to a chamber isolating position, one chamber of said diaphragm cell being subjected to a test reference pressure and the other chamber thereof being in fluid communication with said test part upon movement of said balance valve means to an open circuit position, and a pressure amplifier valve means in said second circuit portion between said instrument and the portion of said second circuit portion that is subjected to said lower pressure, said amplifier valve means being responsive to flexure of said diaphragm to produce a resultant signal pressure which is recorded by said instrument.

References Cited
UNITED STATES PATENTS
2,872,806    2/1959    Mamzie _____ 73—40

FOREIGN PATENTS
736,189    6/1966    Canada.

LOUIS R. PRINCE, *Primary Examiner.*

JEFFREY NOLTON, *Assistant Examiner.*